Dec. 5, 1961     F. A. NOVOTNEY     3,011,664
POWER OPERATED TAIL GATE
Filed March 17, 1959     4 Sheets-Sheet 1
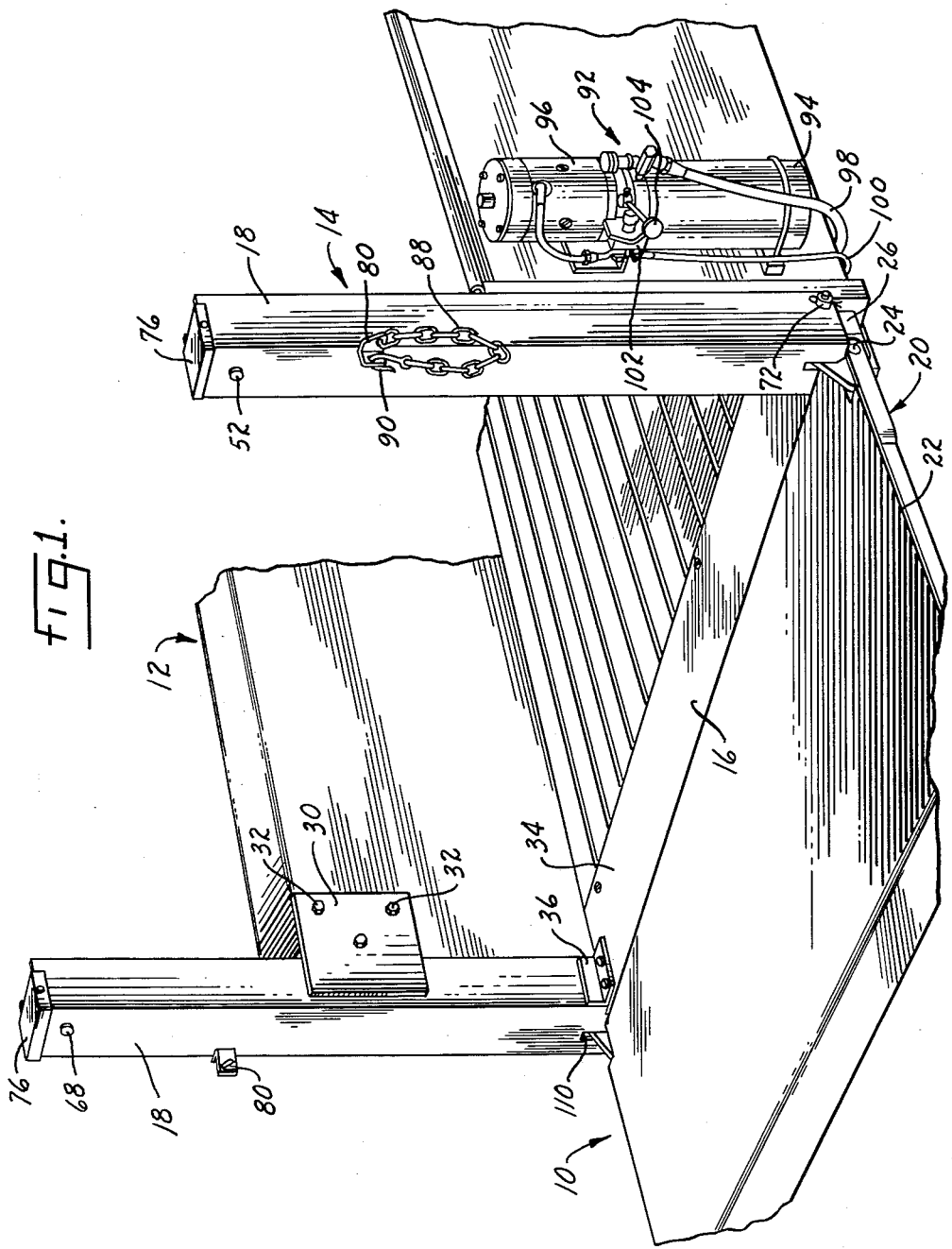
INVENTOR.
Frank A. Novotney,
BY Parker & Carter
Attorneys.

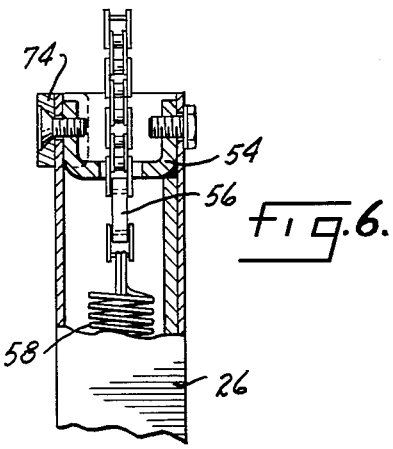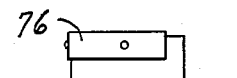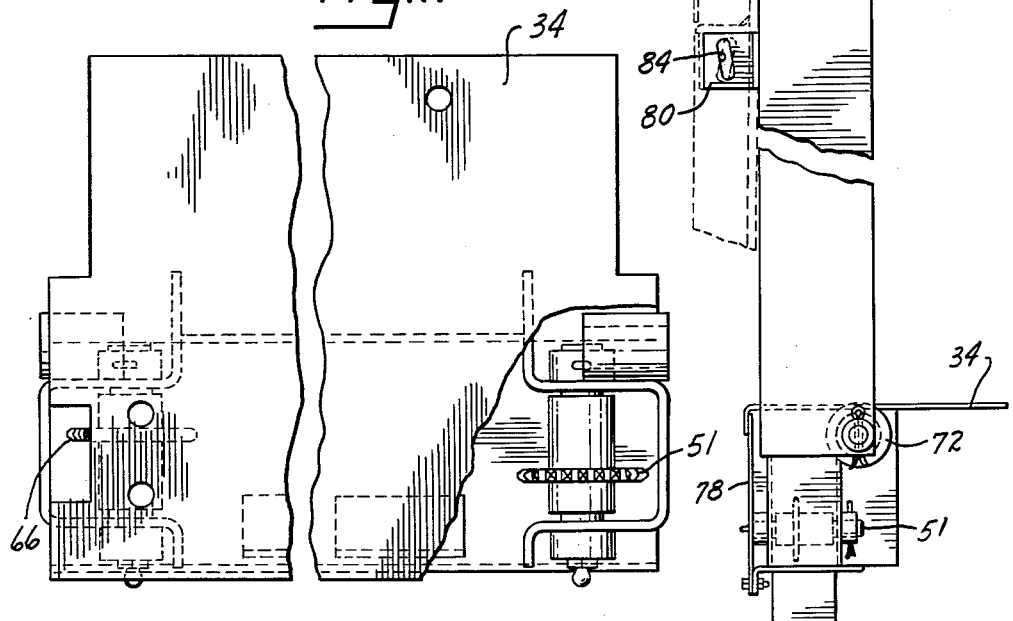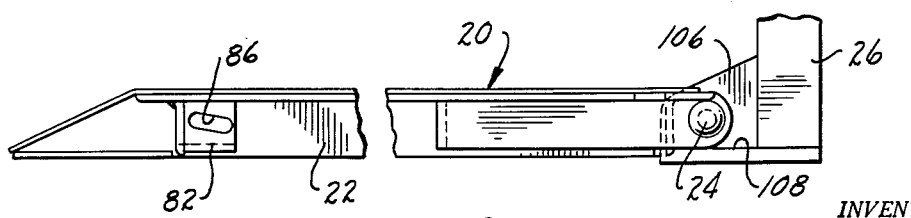

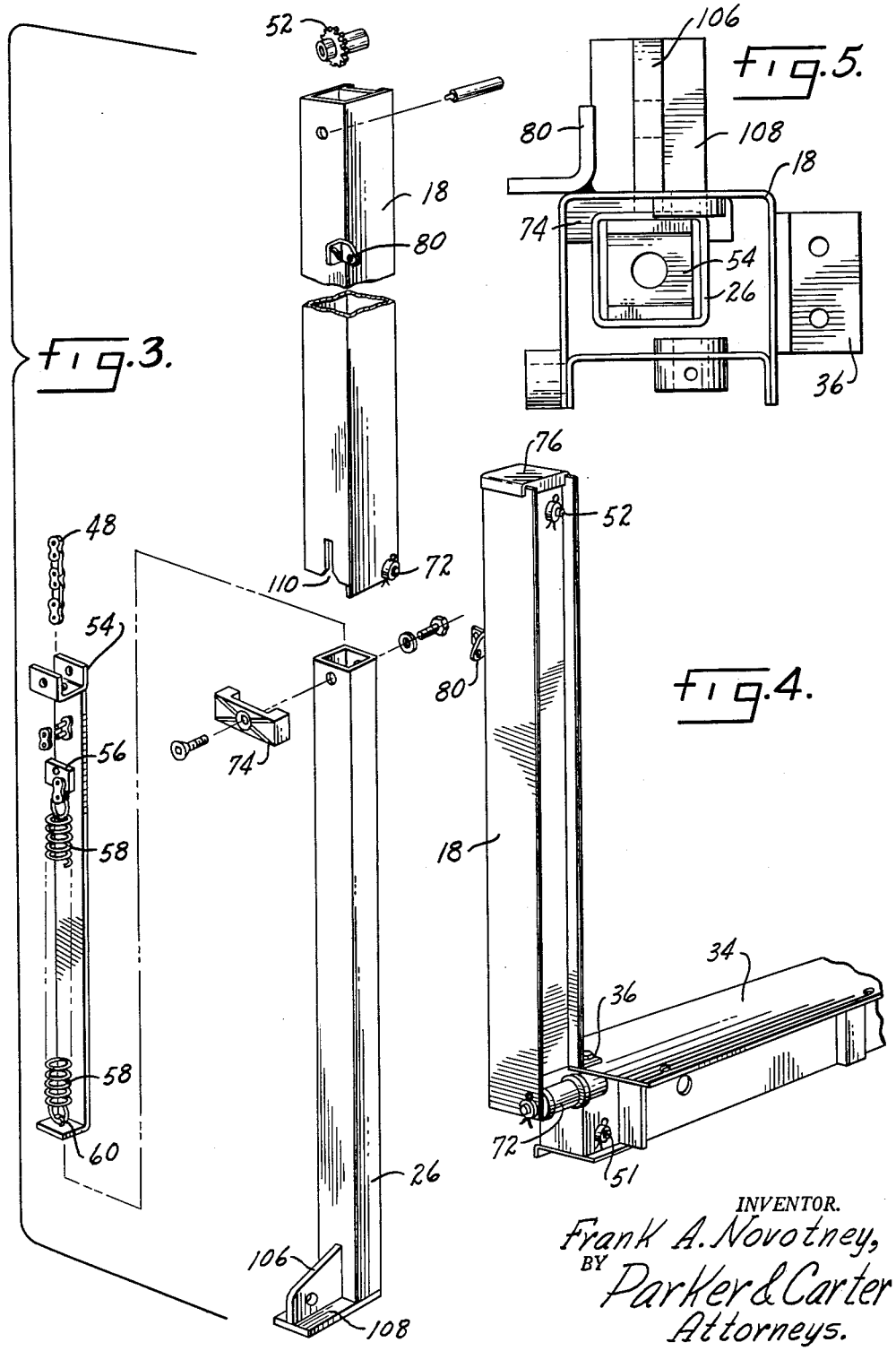

Dec. 5, 1961  F. A. NOVOTNEY  3,011,664
POWER OPERATED TAIL GATE
Filed March 17, 1959  4 Sheets-Sheet 4
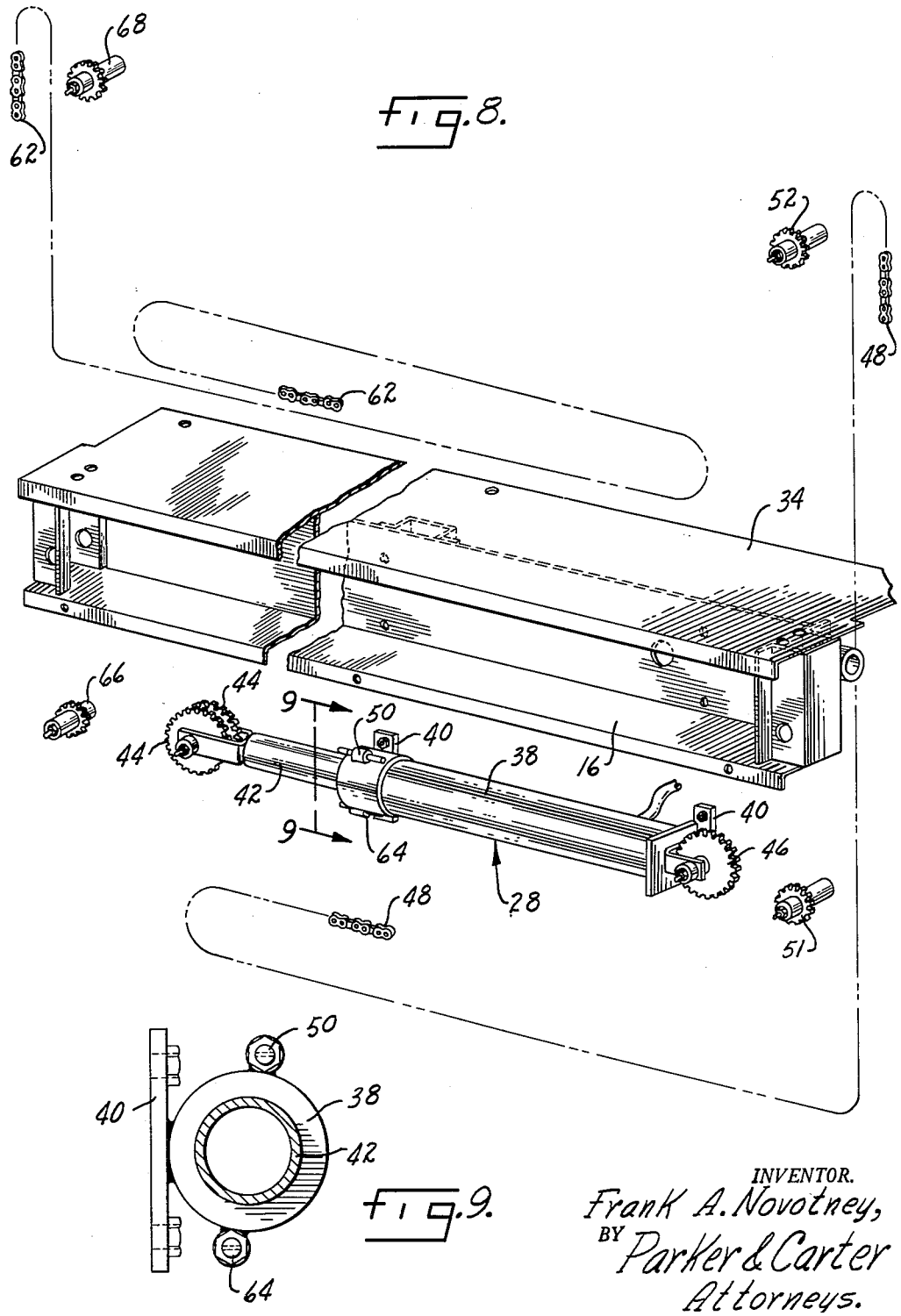
INVENTOR.
Frank A. Novotney,
BY Parker & Carter
Attorneys.

United States Patent Office
3,011,664
Patented Dec. 5, 1961

3,011,664
POWER OPERATED TAIL GATE
Frank A. Novotney, Streator, Ill., assignor to Anthony Company, Streator, Ill., a corporation of Illinois
Filed Mar. 17, 1959, Ser. No. 799,915
3 Claims. (Cl. 214—75)

This invention is in the field of power operated tail gates for use on trucks and the like and is more specifically concerned with what I shall refer as as a light duty unit, for example, for pick-up trucks although many of the inventive features have wide application.

The primary object of the invention is a new and improved power operated tail gate which will not jam in use.

Another object is a tail gate of the above type which is self-tightening when up and closed.

Another object is a power unit for a tail gate of the above type in which a single cylinder and piston raises and lowers each side of the gate simultaneously.

Another object is a slack adjuster for a tail gate of the above type.

Another object is a tail gate assembly which is easy to service but, at the same time, is fully enclosed.

Another object is a tail gate package which is easy to install.

Another object is a power assembly for a tail gate so that two cables or chains, one running to each side of the gate, may be played out or taken in at the same time by a single power cylinder.

Other objects will appear from time to time in the ensuing specification and drawings in which:

FIGURE 1 is a perspective of the tail gate on the rear end of a truck;

FIGURE 2 is a side view of the tail gate, on an enlarged scale;

FIGURE 3 is an exploded view of a part of the assembly shown in FIGURE 2;

FIGURE 4 is a front view of a part of the assembly shown in FIGURE 2;

FIGURE 5 is a top view of the structures of FIGURES 3 and 4 assembled but with parts removed for clarity;

FIGURE 6 is a side view, partly in section, of the upper portion of the assembly;

FIGURE 7 is a plan view, with parts broken away, of the frame assembly;

FIGURE 8 is an exploded view of the power unit and a part of the frame assembly; and FIGURE 9 is a section taken along line 9—9 of FIGURE 8.

In FIGURE 1 I have shown a power operated tail gate assembly, designated generally 10, mounted on the rear end of a pick-up truck, designated generally 12. The details of the mounting will be set forth hereinafter, where important.

The power operated gate itself includes a frame, designated generally 14, which, as shown, is generally U-shaped and has a crosspiece 16 with uprights 18 on each side. It will be noted in FIGURE 1 that this U-shaped frame is constructed to conform to the U-shaped generally open rear end of the pick-up. A gate assembly 20 includes a platform 22 pivoted on each side at 24 to uprights 26. It will be noted that the gate uprights 26 telescope up into the frame uprights 18 and a power means, designated generally 28 in FIGURE 8, to be described in detail hereinafter, raises or lowers the gate uprights and the platform between a raised position, such as shown in FIGURE 1, and a lowered position, shown somewhat in FIGURE 2. At the same time, the platform itself is constructed to be either pivoted open or closed, such as shown in full and in phantom in FIGURE 2.

Considering the frame assembly in detail, the uprights 18 may be made generally of square cross section channel members, each of which may be attached by suitable plates 30 which are welded along their rear edge to the uprights and bolted or otherwise suitably secured to the sides of the pick-up as at 32, such as shown generally in FIGURE 1. These plates 30 might be suitably formed to fit any particular body width. For example, they might be straight or offset or otherwise, such as shown in U.S. Patent No. 2,689,764. The crosspiece 16, in addition to functioning as a mounting means for the assembly, also serves as a housing for a power assembly 28, to be described in detail hereinafter. This crosspiece 16 may be generally U-shaped in cross section, as shown in FIGURE 2, and the top 34 may have a forward extension, as shown in FIGURES 2 and 8, which is constructed to extend up into the pick-up to provide a smooth, flush surface between the frame and the floor of the truck. The uprights and crosspiece may be connected by suitable brackets on each side, as at 36, or by any suitable means.

The power assembly 28, as shown in detail in FIGURE 8, includes a cylinder and piston 38 mounted inside the crosspiece 16 so as to be disposed laterally. The cylinder is mounted or connected to the inside of the crosspiece, preferably to the forward wall, by suitable brackets 40 or the like, shown in FIGURE 8, and the piston, not shown, has a piston rod 42 which carries two sprockets 44 at its outer end. The other end of the cylinder has a single sprocket 46. Two flexible members, shown in this case as chains, extend from the power assembly, one to each side so that each of the gate uprights may be raised and lowered simultaneously. As shown in FIGURE 8, these chains or flexible members are connected to the cylinder housing at one end and, as shown in FIGURES 3 and 6, are connected adjacent or at the top end of the gate uprights. One chain or flexible member 48 is adjustably connected to the cylinder housing, as at 50, in an offset position, then extends around the rear of one sprocket 44, then to the right around a sprocket 51 mounted on the right side of the frame crosspiece 16, then up inside the right side upright 18 of the frame assembly. This chain leads up and around a sprocket or gear 52, mounted generally adjacent the top of the frame upright, as shown in FIGURES 1 and 8, then down through a bracket 54 suitably mounted in the top of the gate upright 26. I provide a suitable stop 56 or the like at or adjacent the end of the chain. It will be noted that the chain passes through a suitable opening in the bracket 54 and the stop 56 is of such a size and dimension that it will not go through the opening. The stop is suitably connected to a spring 58 which may extend down inside of the gate upright and may be dead-ended, as at 60.

The other chain 62 may be adjustably connected to the power cylinder 38, as shown at 64 in FIGURE 8, in an offset position. Then the chain 62 extends around the other forward sprocket 44, then back on top of the cylinder 38, around the single sprocket 46 on the right end of the cylinder, then to the left under the power cylinder and piston to the left side, around a sprocket 66 suitably mounted on the left side of the frame crosspiece. The chain then moves up inside the left side frame upright 18 over a sprocket and pivot 68 mounted generally adjacent or at the top of the left side frame upright, then back down through a bracket in the top of the left side gate upright. The connection of the chain or flexible member to the gate upright may be made the same as that for the right side, and in that sense, FIGURE 6 may be considered to be a showing of either side. In any event, a spring is also used and the spring is preferably dead-ended toward the bottom as in the case of the right side.

This arrangement has the advantage that in the event any slack is created in the chain, the spring 58 will take it up. For example, assume that the gate is being lowered and chain is being played out on both sides of the power assembly. If one side of the gate platform strikes an obstacle, such as the curb, the other side will continue to move. The pivotal connection 24 between the platform and the uprights on each side is sufficiently loose or sloppy so that one side will move a considerable distance while the other is stationary. If one side strikes an obstacle, the other side will continue to move so that the power assembly will play out chain to both sides. The moving side will take its chain, but the stopped side will not. Nevertheless, the power assembly will be feeding cable or chain to the stopped side. When slack starts to appear in the chain on the stopped side, the spring 58 on that side will pull the cable so that at no time will sufficient slack occur to result in damage. If slack would occur, the chain might come off of one of the sprockets or otherwise become entangled. When tension was again put on that side, the chain might be damaged, the sprocket snarled, or the unit otherwise damaged or rendered disabled.

During normal operation, both springs will be extended the maximum amount and the stops 56 will be in engagement with the brackets 54 at or adjacent the top end of the gate uprights. In a sense, the cable is dead-ended at or adjacent the upper end of the gate uprights. But if slack occurs, the spring will pull the cable on either or both sides so that all slack will be immediately taken up.

The gate uprights may be mounted in suitable track or in any suitable manner to move up and down inside of the frame uprights. As shown, the gate uprights are generally square in cross section, such as shown in FIGURES 3 and 5, and I may provide a suitable flanged roller 72 or the like mounted at the lower end of the frame upright. As shown in FIGURE 2, the gate upright will bear against this roller which is disposed behind it. The upper end of the gate upright may be provided with shoes 74 which, as shown in FIGURE 5, are constructed to bear against the rear of the frame upright or channel. Due to the weight of the gate platform itself, the entire gate assembly will have a tendency to pivot counterclockwise in FIGURE 2. Thus the bottom end of the gate uprights will engage the rollers 72 and the top end will force the shoes 74 against the rear of the frame upright, such as shown in FIGURE 5. The particular mounting for the shoes 74 is not considered important, but it may be joined in with the bracket 54, as shown in FIGURE 6. The tops of the frame uprights 18 may be closed by suitable taps 76 or the like.

The rear face plate 78 of the frame crosspiece may be removably mounted, as shown more or less in FIGURE 2, so that the power assembly may be serviced. This may be done by lowering the gate and then removing the plate 78, such as shown in FIGURE 8.

When the gate platform is in its raised position, it is constructed to be pivoted from the open position, shown generally in FIGURE 1, to a closed position, such as shown in phantom lines in FIGURE 2. In this position I lock the gate on each side so that while traveling, it will be held up. This may be done by using suitable brackets, one 80 on the frame upright and the other 82 on the side of the platform. It will be noted that these two brackets will be opposite each other when the gate platform is closed, as shown in FIGURE 2. I provide slots or openings in these brackets, the one 84 in bracket 80 being diagonally disposed downwardly and forward, and the other 86 being diagonally disposed downwardly and rearward, when the gate platform is closed. It will be noticed that these two diagonal openings criss-cross or cross each other when the platform is closed, such as shown in FIGURE 2. I may provide a suitable chain 88, connected to the bracket, and a hook 90 at the end thereof or any suitable fastening element. When the diagonal slots are lined up, as shown in FIGURE 2, the hook may be inserted through them. Thereafter, when power is taken off of the unit and the gate assembly settles lightly, the criss-crossed slots with the hook or pin through them will have a self-tightening action so that by gravity the gate will be forced forward to prevent wear, rattling, and damage to other parts.

I may attach a suitable power assembly on the side of the pick-up, as indicated generally at 92 in FIGURE 1. This may include a suitable pump 94 driven by an electric motor 96, for example a starter motor. The pump may be connected by a suitable hose 98 so that high pressure fluid may be supplied to the power cylinder. I prefer that the unit be oil operated, but it might be air. A suitable cable 100 may bring current from the truck battery to the motor 96 through a terminal 102. The unit may have a suitable operating handle 104. I prefer that the unit be power operated up and returned by gravity. During lowering movement, the piston will force oil back up through line 98. But it might be power operated in both directions.

As shown in FIGURES 2 and 3, the gate platform pivots on extensions or brackets 106 so that when the gate platform is open, as shown in FIGURE 2, it will be held in a generally horizontal position by flanges 108 on the bracket. The forward part of the frame uprights may be suitably slotted, as at 110, to accept these brackets.

The details of construction and make-up of the platform itself are not considered important and may be conventional.

FIGURE 3 is an exploded view of the telescopic uprights, one above the other, with the anti-slack spring and its assembly out to the left. FIGURE 8 is an exploded or disassembled view of the power unit, removed from the frame crosspiece, with the chains, sprockets, etc. also exploded to show the operative relationship. The left side chain 62 has been shown at the top and the right side chain 48 on the bottom and on the right with the upper and lower sprockets adjacent the turns in the chains. The wrap-around of the left chain 62 is shown above the crosspiece while the wrap-around for the lower chain 48 is shown below.

The use, operation and function of the invention are as follows:

I provide a power operated tail gate for use on a truck, preferably a pick-up. The unit includes a frame which is generally U-shaped and adapted to be mounted on the rear opening of the truck. A gate assembly is constructed to be mounted on the frame so as to be raised and lowered. In the lower position the platform of the gate may be generally at or on ground level and in the raised position it should be preferably flush with the floor of the truck body.

The frame may be made up of a crosspiece 16 which houses the power mechanism. Frame uprights at each end of the crosspiece telescope around gate uprights extending up from the forward corners of the platform.

The two chains, which might be cables or wire rope, extend from the power cylinder, around pulleys or sprockets, then up within the frame uprights but outside of the gate uprights. The chains pass around a sprocket or pulley or sheave at the top of the gate uprights, then back down to a connection at the top of the gate uprights. It will be noted that the frame uprights are somewhat longer than the gate uprights. Each of the chains then passes through a suitable bracket in the top of the gate uprights and is provided with a block or stop which functions as a dead-end connection. The end of the chain and block is spring biased downwardly by a suitable coil spring or the like which is inside of the gate upright. The spring pulls down on the chain and if any slack occurs the spring will pull the chain down inside of the gate upright. When the chain is tensioned, however, the block at the end of the chain will be pulled up against the bracket in the top of the gate upright.

By wrapping the two chains around the power cylinder and piston, I can draw in or play out the two chains or flexible members at the same time. It will be noted in FIGURE 9 that the other ends of the chains or cables are adjustably connected on the power cylinder. The operator may adjust these connections so that the platform will be perfectly level. Also in FIGURE 8 it will be noted that the flexible members will be played out uniformly. The dead end adjustable connections on the power cylinder are disposed on each side of the cylinder axis, as shown in FIGURE 9, and the double sprockets or wheels 44 are also offset somewhat from the cylinder axis. The object of this is to provide the double wrap-around effect of the chain on the power cylinder.

If any slack tends to develop in the chains, the springs will immediately take it out. For example, if the gate is being lowered and one side strikes the curb, the power cylinder will continue to feed out a chain to that side. But the spring will merely take it up and no slack will develop. If slack should occur, the chain might come off of one or more sprockets and when the chain was again tensioned, it could bind up, could be off its track, and could result in substantial damage. If the gate is down and a heavy weight is put on the truck body, for example two or three men climb up inside of the pick-up, slack might otherwise result in both chains at once. But in this case, again, the springs will take up this slack.

The locking arrangement shown in FIGURE 2 has the advantage that the gate platform, when closed, will be self-tightening. I have shown a hook, but it might be a pin. The two elongated slots are diagonaled in opposite directions so that when the pin or hook or whatever is used is inserted and the unit settles somewhat, the gate will be wedged tighter instead of loosening.

I prefer to mount a controllable power assembly, such as shown at 92, on the ear end of the truck body, but it might be otherwise. I have not described the details of the mounting of the pump and electric motor in FIGURE 1, but it might be by any suitable type of brackets and the like.

The power assembly may be easily serviced. With the gate in its lower position, the rear panel 78 of the frame crosspiece will be exposed. Aa shown in FIGURE 2, this panel may be removed. Then the power cylinder and piston will be exposed. I have shown these parts broken open in FIGURE 8. Although in FIGURE 8 the power assembly has been removed from the crosspiece, nevertheless, it will be understood that when assembled, the power assembly will be fully housed and protected. Servicing is quite simple and the power parts are fully accessible.

While I have shown and described the preferred form and suggested several variations of my invention, it should be understood that suitable additional modifications, changes, substitutions and variations may be made without departing from the invention's fundamental theme. I, therefore, wish that the invention be unrestricted, except as by the appended claims.

I claim:

1. In a power operated tail gate for trucks and the like, a generally U-shaped frame adapted to be attached to the rear end of a truck including a laterally disposed generally U-shaped crosspiece with the open end toward the rear of the truck and a closed, hollow upright on each of the crosspiece, a gate assembly mounted on the frame for movement between a raised and lowered position including a platform and an upright on each side, the uprights of the gate assembly and frame being telescoped with the gate uprights positioned within the frame uprights, power means for raising and lowering the gate assembly including a piston and cylinder mounted laterally in the crosspiece, two flexible members operably connected to the gate assembly and fastened to said cylinder on opposite sides thereof and extending in the same direction along said cylinder, said flexible members passing around said piston and then again extending in the same direction on opposite sides of said cylinder, each flexible member passing upwardly inside of the closed frame uprights and then around a pivot adjacent the top of the frame upright, said flexible members each extending downwardly through a bracket mounted on the gate upright and inside of the gate upright, a spring positioned in each gate upright and connected to an end of a flexible member within the gate upright, and a stop between the end of each flexible member and the bracket.

2. In a power operated tailgate for trucks and the like, a generally U-shaped frame adapted to be attached to the rear end of a truck including a laterally disposed crosspiece and an upright on each end thereof, a gate assembly mounted on the frame for movement between a raised and lowered position including a platform and an upright on each side, the uprights of the gate assembly and frame being telescoped, power means for raising and lowering the gate assembly including a piston and cylinder mounted laterally in the crosspiece, two flexible members operably connected to the gate assembly and fastened to said cylinder on opposite sides thereof and extending in the same direction along said cylinder, said flexible members passing around said piston and then again extending in the same direction on opposite sides of said cylinder, said flexible members passing upwardly and then around a pivot adjacent the top of the frame upright and then extending downwardly through a bracket mounted on the gate upright, and a bracket on one frame upright and a bracket on said platform, said brackets being opposed when the platform is closed, diagonal slots in the brackets, a slot in one bracket being diagonaled opposite from the slot in the opposite bracket, and a pin adapted to be positioned in the opening defined by the aligned slots.

3. In a power operated tailgate for trucks and the like, a generally U-shaped frame adapted to be attached to the rear end of a truck including a laterally disposed crosspiece and an upright on each end thereof, a gate assembly mounted on the frame for movement between a raised and lowered position including a platform and an upright on each side, power means for raising and lowering the gate assembly including a piston and cylinder mounted in the crosspiece, and a bracket on one frame upright and a bracket on said platform, said brackets being opposed when the platform is closed, diagonal slots in the brackets, the slot in one bracket being diagonaled opposite from the slot in the opposite bracket, and a pin adapted to be positioned in the opening defined by the aligned slots.

References Cited in the file of this patent

UNITED STATES PATENTS

| | | |
|---|---|---|
| 2,241,798 | Weiss | May 13, 1941 |
| 2,408,757 | Dunlop | Oct. 8, 1946 |
| 2,706,565 | Krasno | Apr. 19, 1955 |
| 2,787,338 | Quayle | Apr. 2, 1957 |

FOREIGN PATENTS

| | | |
|---|---|---|
| 776,002 | Great Britain | May 29, 1957 |